(12) United States Patent
Okitsu et al.

(10) Patent No.: US 8,442,692 B2
(45) Date of Patent: May 14, 2013

(54) METHOD FOR PERFORMING ADAPTIVE FRICTION COMPENSATION IN AN ACTUATOR ACCOUNTING FOR VARIATION IN FRICTION CHARACTERISTICS OF WAVE GEAR DRIVE ACCOMPANYING CHANGE IN TEMPERATURE

(75) Inventors: Yoshifumi Okitsu, Azumino (JP); Yuki Kato, Azumino (JP); Kozo Sasaki, Azumino (JP); Makoto Iwasaki, Nagoya (JP)

(73) Assignees: Harmonic Drive Systems, Inc., Tokyo (JP); National University Corporation Nagoya Institute of Technology, Aichi (JP)

( * ) Notice: Subject to any disclaimer, the term of this patent is extended or adjusted under 35 U.S.C. 154(b) by 237 days.

(21) Appl. No.: 13/072,898

(22) Filed: Mar. 28, 2011

(65) Prior Publication Data

US 2011/0251722 A1    Oct. 13, 2011

(30) Foreign Application Priority Data

Apr. 9, 2010    (JP) ................................. 2010-090694

(51) Int. Cl.
*G05D 13/00*    (2006.01)

(52) U.S. Cl.
USPC ........................... 700/275; 700/28; 360/78.04

(58) Field of Classification Search ........................ None
See application file for complete search history.

(56) References Cited

U.S. PATENT DOCUMENTS

| | | | |
|---|---|---|---|
| 6,054,833 A * | 4/2000 | Takeuchi ...................... | 318/638 |
| 7,440,225 B1 * | 10/2008 | Chen et al. .................. | 360/78.04 |
| 8,013,560 B2 * | 9/2011 | Sasaki et al. ................. | 318/632 |
| 2011/0248661 A1 * | 10/2011 | Okitsu et al. ................. | 318/632 |

FOREIGN PATENT DOCUMENTS

JP    2006-146572 A    6/2006

OTHER PUBLICATIONS

Rizos et al. "Friction Identification based upon the LuGre and Maxwell Slip Models", IEEE Transactions on Control Systems Technology, vol. 17, pp. 153-160, 2009.*
Wilaiporn Ngernbaht Resonance and Friction Compensations in a Micro Hard Drive, WSEAS Transactions on Information Science and Applications, Issue 5, vol. 6, May 2009.*
Henrik Olsson et al., Friction Generated Limit Cycles IEEE Jul. 2001.*
Brian Armstrong, et al; Miscellaneous Mechanical Control Systems. The Control Handbook, 1369-1382, 1996.*

* cited by examiner

*Primary Examiner* — Kavita Padmanabhan
*Assistant Examiner* — Michael Scapin
(74) *Attorney, Agent, or Firm* — Buchanan Ingersoll & Rooney PC

(57) ABSTRACT

According to a method for performing adaptive friction compensation of an actuator including a wave gear drive, there is used as a friction compensation current applied to a motor drive current a static friction compensation current $i_s$ when a motor shaft stops with a deviation, and a Coulomb friction compensation current $i_c$ in other circumstances. The static friction compensation current $i_s$ is obtained by adding a compensation amount $i_{sr}$ of a monotonically increasing ramp function to a compensation amount $i_{ss}$ of a step function, and a step-function compensation amount $i_{cs}$ is used as the Coulomb friction compensation current $i_c$. Since the amount of friction compensation can be changed adaptively based on the data during positioning-control response, a motor shaft can be stabilized at a target angle without prominent accompanying vibration, even if the ambient temperature changes and the friction characteristics of the wave gear drive fluctuate.

13 Claims, 16 Drawing Sheets

BLOCK SCHEMATIC DIAGRAM OF ADAPTIVE FRICTION COMPENSATION

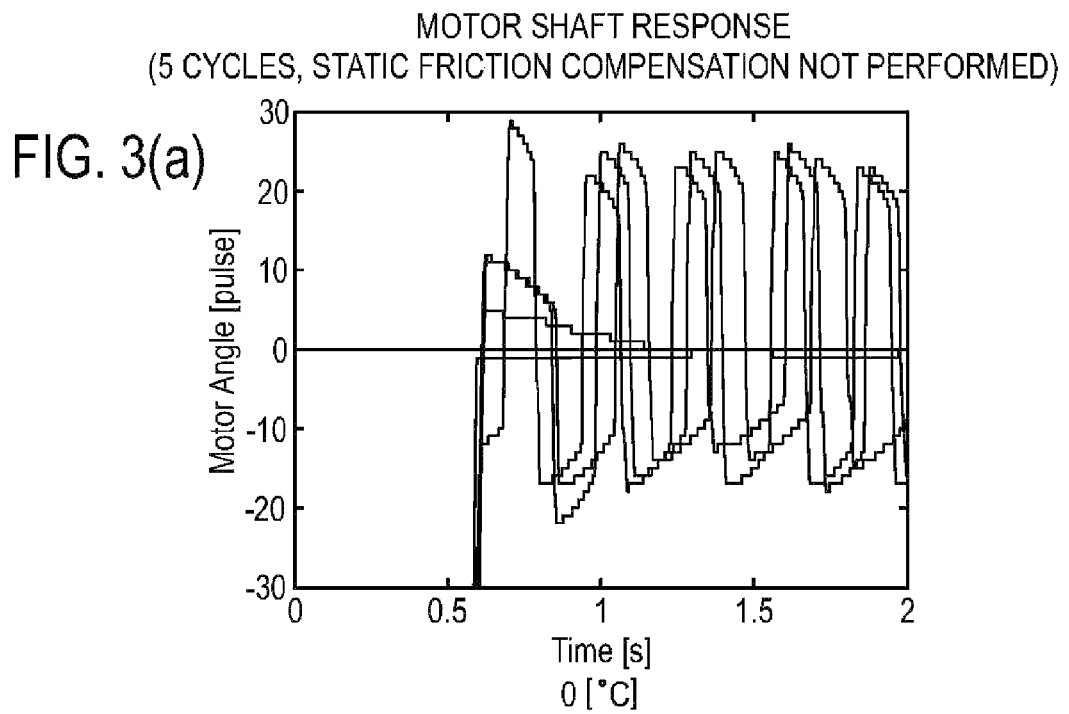
FIG. 3(a) MOTOR SHAFT RESPONSE
(5 CYCLES, STATIC FRICTION COMPENSATION NOT PERFORMED)
0 [°C]
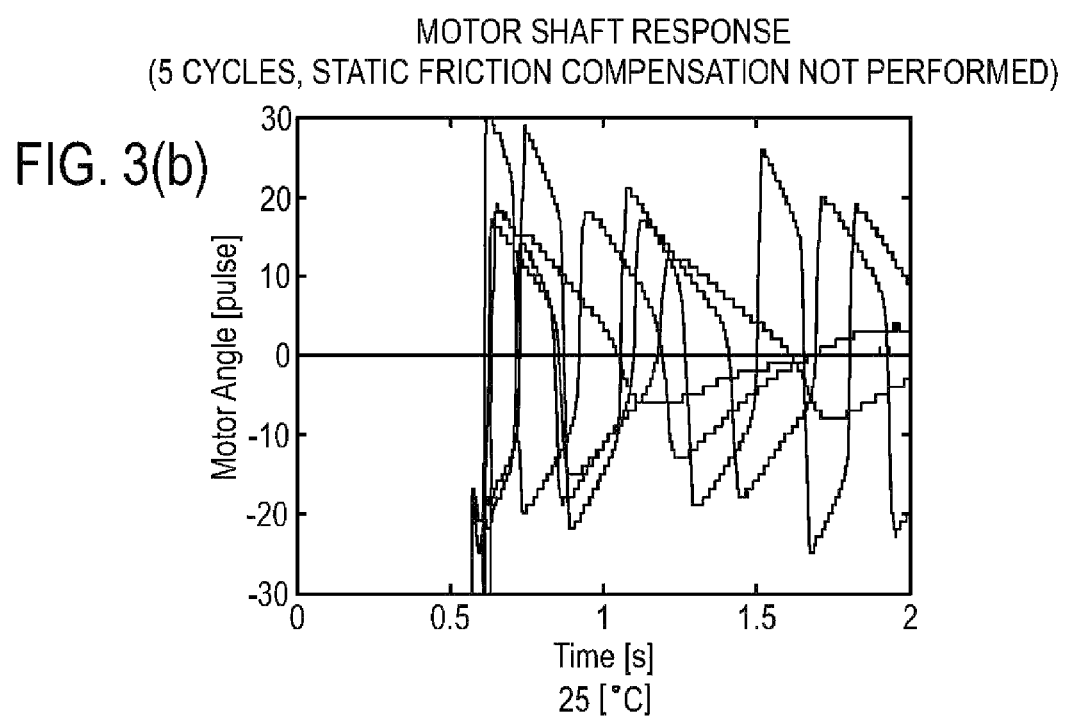
FIG. 3(b) MOTOR SHAFT RESPONSE
(5 CYCLES, STATIC FRICTION COMPENSATION NOT PERFORMED)
25 [°C]

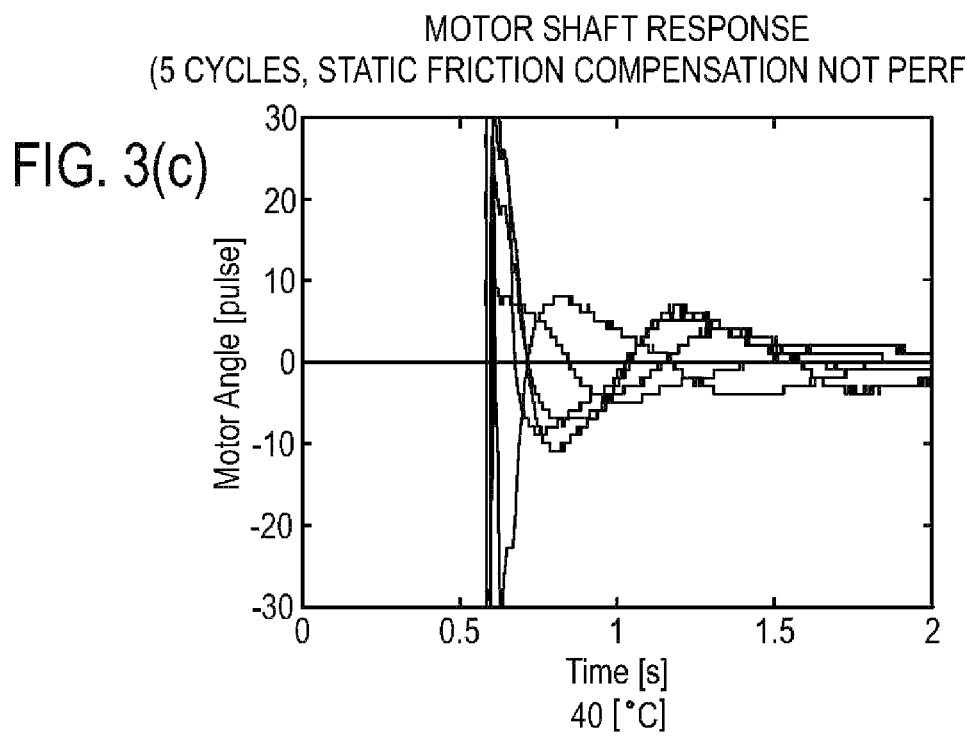

BLOCK SCHEMATIC DIAGRAM OF ADAPTIVE FRICTION COMPENSATION

MOTOR SHAFT RESPONSE AND STATIC FRICTION COMPENSATION AMOUNT

WHEN FRICTION COMPENSATION IS INSUFFICIENT

MOTOR SHAFT RESPONSE AND ADAPTIVE FRICTION COMPENSATION AMOUNT

WHEN TARGET ANGLE REACHED

METHOD FOR PERFORMING ADAPTIVE FRICTION COMPENSATION IN AN ACTUATOR ACCOUNTING FOR VARIATION IN FRICTION CHARACTERISTICS OF WAVE GEAR DRIVE ACCOMPANYING CHANGE IN TEMPERATURE

BACKGROUND OF THE INVENTION

1. Field of the Invention

The present invention relates to a positioning control method wherein high-accuracy positioning control of a load shaft is enabled by a semi-closed loop control system in an actuator in which a wave gear drive is employed. More particularly, the invention relates to an adaptive friction compensation method making it possible to compensate for lowered positioning accuracy of a load shaft caused by variation in the frictional characteristics of a wave gear drive accompanying changes in temperature.

2. Description of the Related Art

In an actuator 2 wherein the wave gear device 1 shown in FIG. 1 is used as a reducer, it is impossible to control the positioning of a load shaft 3 of the actuator with a high degree of accuracy without accounting for variation in the frictional characteristics of the wave gear drive 1 due to temperature change. Specifically, in the actuator 2, a semi-closed loop system for controlling the position of the load shaft 3 based on the detected position of a motor shaft 6 of a motor 4 is used to perform a drive control whereby output rotation of the motor 4 is reduced via the wave gear drive 1 and transmitted from the load shaft 3 toward a load 5. Accordingly, when the friction characteristics of the wave gear drive 1 change due to changes in the ambient temperature, the accuracy with which the load shaft 3 is positioned by the semi-closed control system is lowered. In Patent Document 1 there is disclosed a servo controller for controlling the drive of an actuator, wherein a simulation is used to accurately determine the frictional force that changes with time and temperature, so that positioning control as well as other actions are performed with precision, based on the results.

JP-A 2006-146572

SUMMARY OF THE INVENTION

Therefore, in order to perform precise control under a variety of temperature environments and drive conditions, it is important to ascertain the conditions in which the system operates, necessitating sensors and other equipment and adversely affecting the cost.

An object of the present invention is to provide a method for performing adaptive friction compensation in an actuator, making it possible to improve control performance without using a temperature sensor when the friction characteristics of a wave gear drive vary under changes in temperature.

In order to solve the aforesaid object, the present invention is a method for performing adaptive friction compensation in an actuator, comprising: using a semi-closed loop system for controlling a position of a load shaft on the basis of a detected position of a motor shaft of a motor to perform drive control of an actuator in which output rotation of the motor is reduced via a wave gear drive and transmitted from the load shaft toward a load; and minimizing a reduction in accuracy with which the load shaft is positioned by the semi-closed control system, as caused by variation in friction characteristics of the wave gear drive accompanying a change in the ambient temperature; the method for performing adaptive friction compensation in an actuator while accounting for variation in friction characteristics of a wave gear drive accompanying changes in temperature characterized in comprising: using, as a friction compensation current $i_{comp}$ applied to a motor drive current for driving the motor, a static friction compensation current $i_s$ when the motor shaft stops with a deviation, and a Coulomb friction compensation current $i_c$ in other circumstances, as shown in Formula (A)

[Formula A]

$$i_{comp}[k] = \begin{cases} i_s[k] & (|e[k]| > 0 \text{ and } \omega_m[k] = 0) \\ i_c[k] & (\text{otherwise}) \end{cases} \quad (A)$$

(where k is the present time, e[k] is the motor shaft deviation, and ω[k] is the motor shaft speed);

defining the static friction compensation current $i_s$ according to Formula (B), wherein a compensation amount $i_{sr}$ of a monotonically increasing ramp function defined by Formula (C) is added to a compensation amount $i_{ss}$ of a step function

[Formula B]

$$i_s[k] = \begin{cases} \text{sgn}(e[k]) \cdot (i_{ss} + i_{sr}[k]) & (|e[k]| > 0) \\ 0 & (\text{otherwise}) \end{cases} \quad (B)$$

[Formula C]

$$i_{sr}[k] = i_{sr0}[k] + d_{sr} \cdot (k - l) \quad (C)$$

(where $i_{sr0}$ is a default value of the ramp-function compensation amount $i_{sr}$, $d_{sr}$ is the amount of ramp increase, and l is a time at which a friction compensation actuation commences); and having the Coulomb friction compensation current $i_c$ be a step-function compensation amount $i_{cs}$ or a ramp-function compensation amount $i_{cr}$, defined according to Formula (D).

[Formula D]

$$i_c = \begin{cases} \text{sgn}(\omega_m[k]) \cdot i_{cs} & (e[k] \neq 0) \\ i_{cr}[k] & (e[k] = 0) \end{cases} \quad (D)$$

The present invention is further characterized in comprising: updating, when the motor shaft is re-actuated, the default value $i_{sr0}$ of the ramp-function compensation amount $i_{sr}$ used for calculating the static friction compensation current $i_s$, using a value obtained by multiplying the immediately preceding ramp-function compensation amount $i_{sr}$ by a friction update value r, as shown in Formula (E).

[Formula E]

$$i_{sr0}[k] = \begin{cases} i_{sr}[k-1] \cdot r & (\omega_m[k] \neq 0) \\ i_{sr0}[k] & (\omega_m[k] = 0) \end{cases} \quad (E)$$

The present invention is further characterized in comprising: on conclusion of a positioning trial, increasing by a pre-set step compensation increase amount $i_{ss\_i}$ the value of the step-function compensation amount $i_{ss}$ used for calculating the static friction compensation current $i_s$ in a case where the motor shaft does not reach a pre-set stabilization range $\theta_{stab}$ even once in a given positioning trial; decreasing by a pre-set step compensation decrease amount $i_{ss\_d}$ the value of the compensation amount $i_{ss}$ in a case where the motor shaft exhibits persistent vibration exceeding the stabilization range $\theta_{stab}$ even after having reached the stabilization range in a given positioning trial; and determining that the vibration exceeding the stabilization range $\theta_{stab}$ persists in a case where the motor shaft has reached the stabilization range one or more times during positioning, but an angle thereof falls outside the stabilization range $\theta_{stab}$ at a trial-concluding time $t_{Set}$, as shown in Formula (F).

[Formula F]

$$i_{ss} = \begin{cases} i_{ss} + i_{ss\_i} & (|e[t_{Set}]| > \theta_{stab} \text{ and flag} = 0) \\ i_{ss} - i_{ss\_d} & (|e[t_{Set}]| > \theta_{stab} \text{ and flag} = 1) \\ i_{ss} & (\text{otherwise}) \end{cases} \quad (F)$$

(where "flag" is a flag indicating that the stabilization range has been reached)

The present invention is further characterized in comprising: decreasing, from a pre-set value $i_{cs\_effect}$ to an even smaller value $i_{cs\_stab}$, the step-function compensation amount $i_{cs}$ used for calculating the Coulomb friction compensation current $i_c$ within a stabilization range $\theta_{stab}$ smaller than a pre-set effective friction compensation range $\theta_{effect}$ ($\theta_{stab} < \theta_{effect}$).

Therefore, it is desirable for the Coulomb friction compensation current $i_c$ ($i_{cs}$) when the motor shaft is stopped to be zero, except when the motor shaft speed is lower than the pre-set value, in the effective friction compensation range $\theta_{effect}$.

The present invention is further characterized in comprising: using, as the ramp-function compensation amount $i_{cr}$ used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

According to the present invention, the friction compensation amount can be adaptively changed based on data expressing the motor shaft deviation, the motor shaft speed, the stabilization state, and other data obtained during response. This makes it possible to calculate a consistently suitable friction compensation amount, even if the ambient temperature changes and the friction characteristics vary; and to stabilize the motor shaft at a target angle without causing prominent vibration thereof.

BRIEF DESCRIPTION OF THE DRAWINGS

FIG. 3 represents graphs (a) to (c), which show motor shaft response states at different temperatures when static friction compensation is not performed;

DESCRIPTION OF THE PREFERRED EMBODIMENTS (1. Variation in Positioning Performance During Change in Temperature)

The inventors performed an analysis of the characteristics dependent on the change in temperature of a wave gear device in an actuator. Specifically, they performed an analysis of the variation in friction characteristics dependent on the change in temperature of a wave gear device during positioning control of an actuator, prior to and following stoppage of the motor shaft.

First, the factors contributing to the change in temperature of an actuator are broadly regarded to be the heat given off by the motor and the change in the ambient temperature. However, making an accurate model of self-heating necessitates taking into account the thermodynamics of the heat associated with driving and the heat dissipated from aluminum fixtures, and performing a detailed analysis is difficult given that the desired temperature state cannot be maintained. Therefore, changes in positional response were investigated under the experimental conditions shown in Table 1, in a state where the ambient temperature, which had been set to 10° C., 25° C., or 40° C. using a constant-temperature bath enabling a desired ambient temperature to be achieved, had reached a uniform state (hereafter this state is called "under pre-set ambient temperature"). As regards the relationship between the heat given off by the motor and the ambient temperature, the experiment showed that the results obtained under self-heat and under pre-set ambient temperature were equivalent.

TABLE 1

| Experimental conditions | |
| --- | --- |
| Action: | Continuous unidirectional positioning action |
| Control system: | P-PI control system + static friction compensation   P-PI control system |
| Static friction compensation: | 0.07[A]   None |
| Feed angle: | 43.56 [deg] (Motor shaft: 6.05 rotations) |
| Interval: | 2 [s] |
| Rotation direction: | CW |

Figure 1:
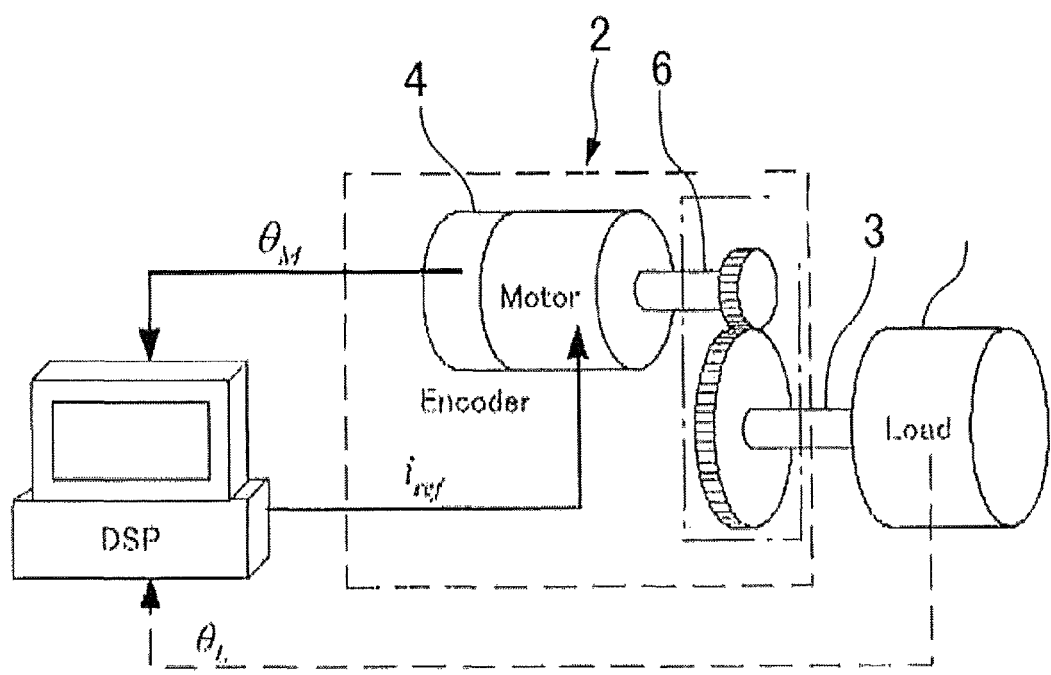
FIG. 1 is an explanatory drawing showing a system to be controlled by the present invention.
Figure 2A:
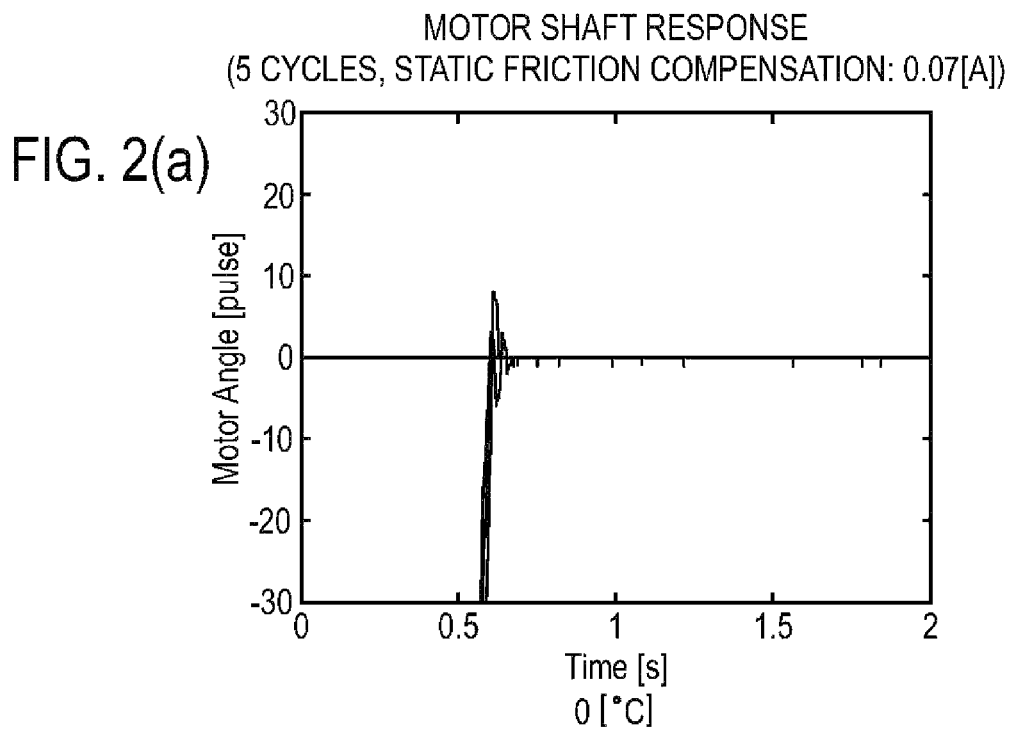
FIG. 2 represents graphs (a) to (c), which show motor shaft response states at different temperatures when a constant static friction compensation amount is used.
Figure 2B:
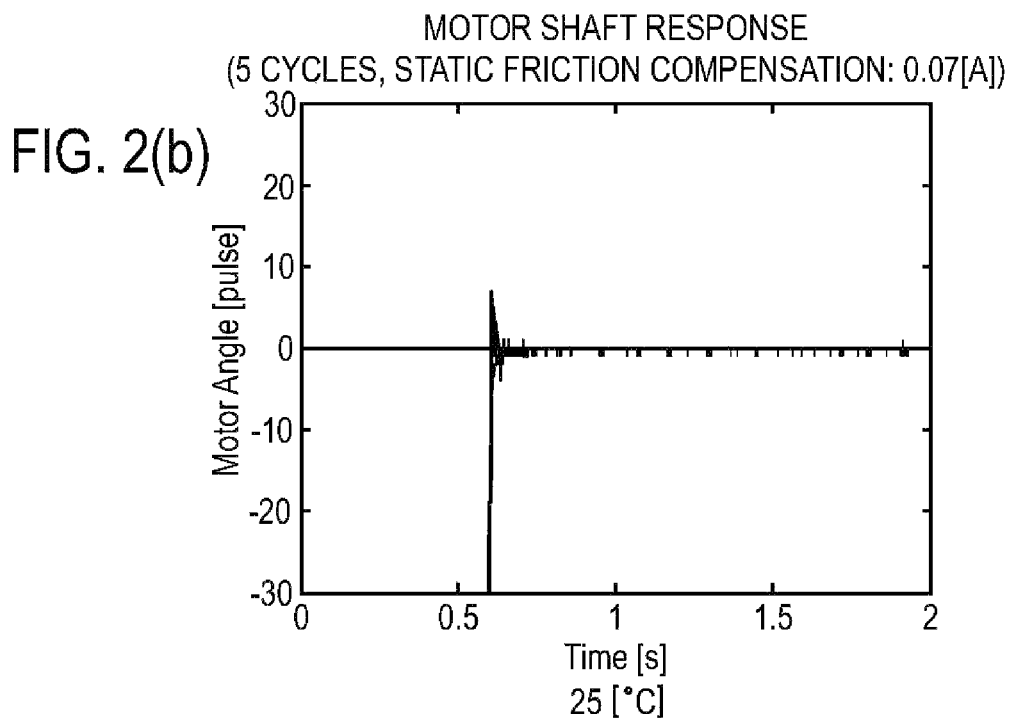
Figure 2C:
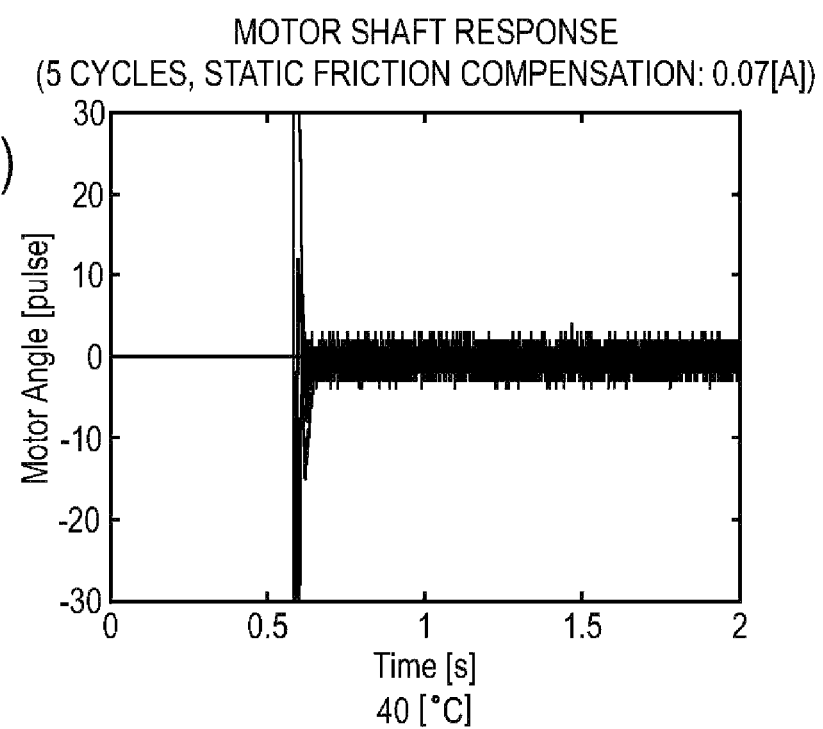

The response of the motor shaft of the actuator (occasionally referred to as "the device" hereunder) shown in FIG. 1 during static friction compensation is shown in FIG. 2. The vertical axis of FIG. 2 shows the value measured by a motor shaft encoder (pulses). FIG. 2 shows that at 10° C. and 25° C., the motor shaft stabilizes at the target angle, whereas at 40° C., despite the motor shaft reaching the target angle, vibration is generated to the extent of approximately ±4 pulses relative to the target angle, from which it can be confirmed that variation in the characteristics causes excessive static friction compensation.

Figure 4A:
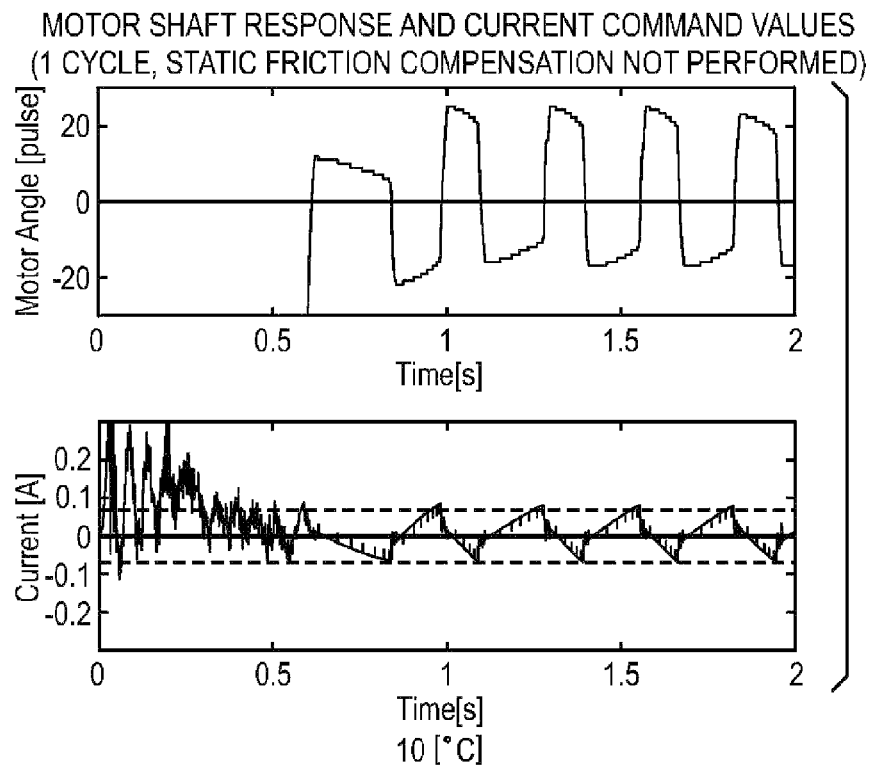
FIG. 4 represents graphs (a) to (c), which show motor shaft response and current command values at different temperatures when static friction compensation is not performed.
Figure 4B:
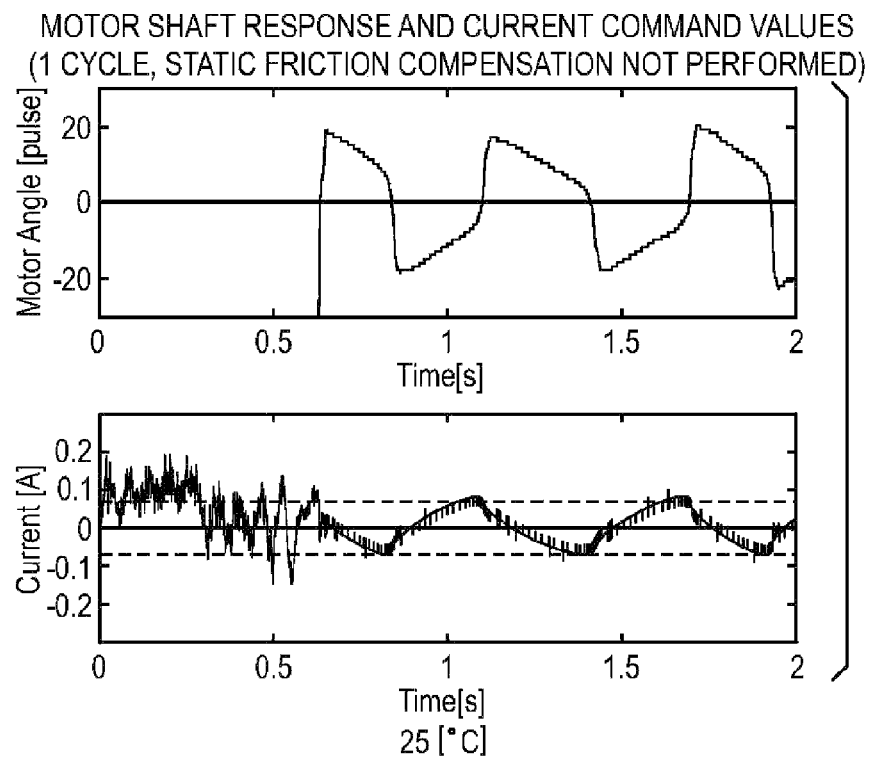
Figure 4C:
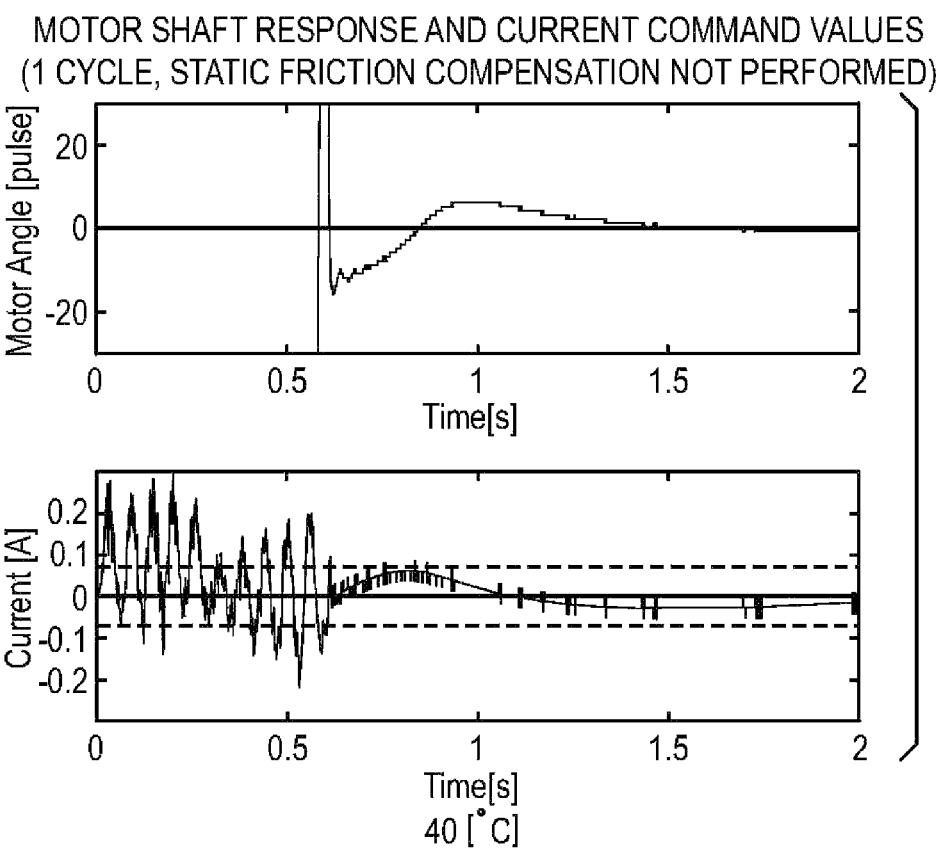

Therefore, in order to investigate variation in the friction characteristics before and after the motor shaft stops during positioning, FIGS. 3 and 4 show the non-compensation response, where no static friction compensation is performed. The dotted lines above and below the horizontal axis in the lower parts of FIGS. 4(*a*) through (*c*) indicate ±0.07 A.

Based on the motor shaft response shown in FIG. 3, at 10° C. and 25° C. vibration persists due to the stick-slip phenomenon, whereas at 40° C. the response gently stabilizes, without prominent vibration. FIG. 4 shows that at both 10° C. and 25° C., the direction of actuation reverses close to where the current command is 0.07 A due to static friction, whereas at 40° C., the direction of actuation reverses before the current command reaches 0.07 A. By comparing [the results obtained at] 10° C. and 25° C. it is possible to confirm that the vibration cycles during the stick-slip phenomenon are different, and there is believed to be a gentle transition from kinetic friction to static friction when the motor shaft is stopped and the ambient temperature increases.

Based on the foregoing, the change in response in the vicinity of the target angle is presumed mainly to be due to variation in the friction characteristics, and in order to stop the motor shaft at the target angle under all temperatures static friction compensation needs to be expanded into a compensation method robust enough to account for the variation in friction characteristics due to changes in temperature.

(2. Expansion to Adaptive Friction Compensation)

As described above, the motor shaft could not be stopped at the target angle under an ambient temperature of 40° C. using a conventional static friction compensation method. Therefore, the compensation is expanded to friction compensation that is robust in regard to the variation in friction characteristics in response to changes in temperature (hereafter referred to as "adaptive friction compensation").

In adaptive friction compensation, the following main points are taken into account:

1) The friction compensation amount is changed based on data obtained during a response so that there will be neither overcompensation nor undercompensation even if the friction varies.

2) With conventional static friction compensation methods, only the friction during stoppage is accounted for, and when the motor shaft is actuated, the compensation is zero. Accordingly, Coulomb friction compensation is applied in addition to static friction compensation because there are cases in which the motor shaft stops immediately after moving a very small amount.

Adaptive friction compensation is divided into static friction compensation and Coulomb friction compensation, and the friction compensation amount $i_{comp}$ is determined by switching between the static friction compensation amount $i_s$ and the Coulomb friction compensation amount $i_c$ shown in Formula (1) according to data obtained during response.

[Formula 1]

$$i_{comp}[k] = \begin{cases} i_s[k] & (|e[k]| > 0 \text{ and } \omega_m[k] = 0) \\ i_c[k] & (\text{otherwise}) \end{cases} \quad (1)$$

(where k is the present time, e[k] is the motor shaft deviation, and ω[k] is the motor shaft speed).

A compensation amount of an integrator is superimposed during static friction compensation; therefore, if an appropriate compensation amount is not entered, compensation degradation occurs. Accordingly, the internal state of the integrator is cleared when static friction compensation commences and terminates, as with conventional static friction compensation methods.

In terms of the object to be controlled, since the motor shaft encoder has a low resolution, and a large control input is added from a speed loop due to the effect of a quantization error when the motor shaft begins to rotate, a speed feedback signal of zero is used when the motor shaft is re-actuated.

Figure 5:
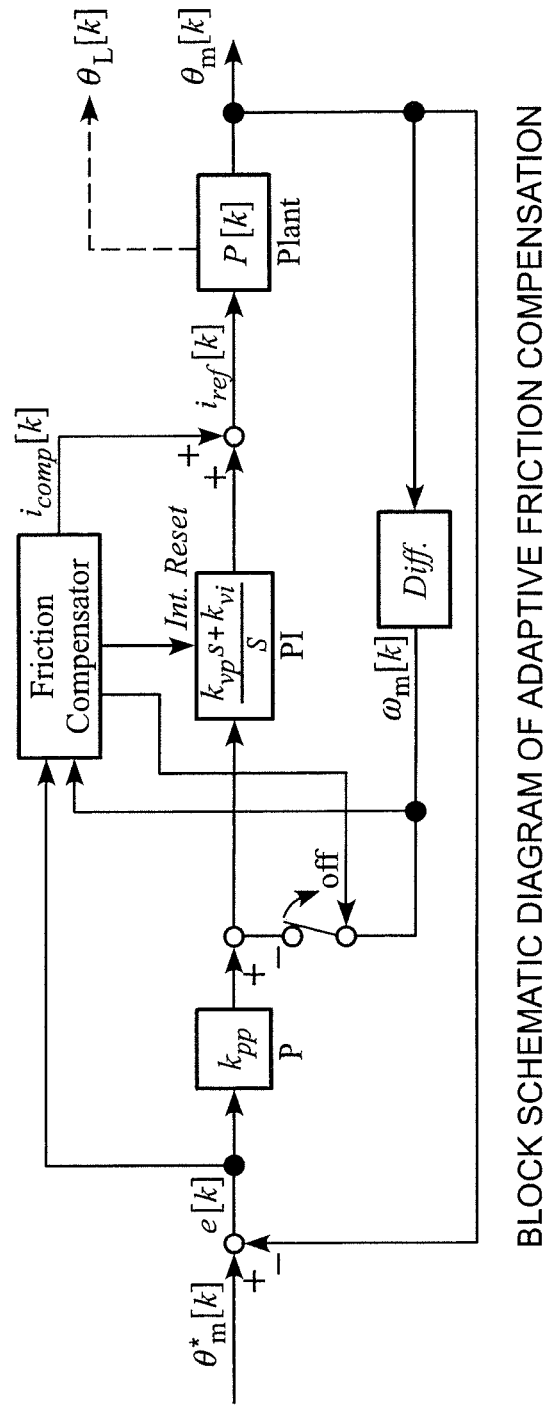
FIG. 5 is a block schematic diagram showing a control system wherein adaptive friction compensation is performed according to the present invention.
Figure 6:
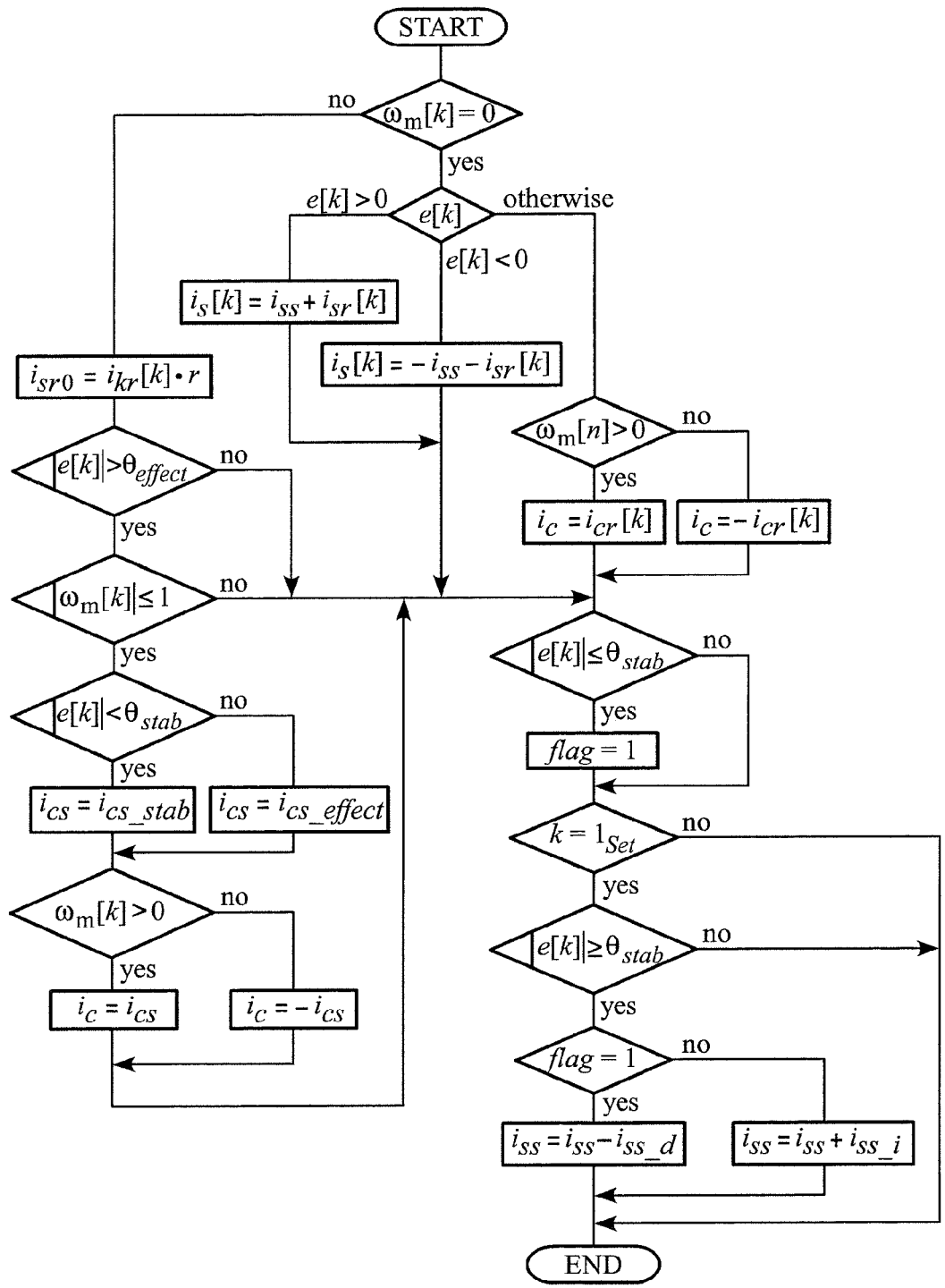
FIG. 6 is a flowchart showing a procedure by which adaptive friction compensation is performed according to the present invention.

FIG. 5 is a block schematic diagram of the adaptive friction compensation according to the present invention, and FIG. 6 is a flow chart associated therewith. The specific process of adaptive friction compensation is explained with reference to these drawings. Symbols used in FIG. 6 are as follows:

$i_s$: STATIC FRICTION COMPENSATION CURRENT [A]
$i_{ss}$: STEP COMPENSATION AMOUNT [A]
$i_{ss\_d}$: STEP COMPENSATION DECREASE AMOUNT [A]
$i_{ss\_i}$: STEP COMPENSATION INCREASE AMOUNT [A]
$i_{sr}$: RAMP COMPENSATION AMOUNT [A]
$i_c$: COULOMB FRICTION COMPENSATION CURRENT [A]
$i_{cs}$: STEP COMPENSATION AMOUNT [A]
$i_{cr}$: RAMP COMPENSATION AMOUNT [A]
$\theta_{effect}$: EFFECTIVE FRICTION COMPENSATION RANGE [pulse]
$\theta_{stab}$: STABILIZATION RANGE [pulse]
$t_{Set}$: POSITIONING CONCLUDING TIME [sample]
n: TIME STOPPED AT TARGET ANGLE [sample]
flag: FLAG INDICATING THAT THE STABILIZATION RANGE HAS BEEN REACHED (2.1 Static Friction Compensation (when Motor Shaft is Stopped))

With conventional static friction compensation, an amount of compensation corresponding to the maximum static frictional force measured in advance when the motor shaft is stopped is applied in a stepped configuration, whereby the motor shaft is forcibly caused to move. Therefore, in cases when the frictional force varies due to changes in temperature and other factors, compensation accuracy degrades due to overcompensation or undercompensation.

Therefore, in adaptive friction compensation, the static friction compensation amount $i_s$ applied when the motor shaft stops with a deviation is determined as follows.

The static friction compensation amount $i_s$ is applied when the motor shaft stops with a deviation. A compensation amount $i_{sr}$ of the monotonically increasing ramp function of Formula (3) is added to the step-function compensation amount $i_{ss}$, as shown in Formula (2), whereby the static friction compensation amount $i_s$ is gradually increased until the motor shaft is actuated, and the robustness with respect to temperature is improved. In this case, it is necessary that a small value be used for the step-function compensation amount $i_{ss}$ in order to avoid overcompensation.

When the ramp-function compensation amount $i_{sr}$ is increased from zero each time the motor shaft stops, it is necessary to wait for $i_{sr}$ to increase each time the motor shaft stops, and more time is needed before stabilization occurs. Therefore, when the motor shaft is re-actuated, the default value $i_{sr0}$ of the compensation amount $i_{sr}$ is updated by multiplying the immediately preceding ramp-function compensation amount $i_{sr}$ by a friction update value r, as shown in Formula (4).

[Formula 2]
$$i_s[k] = \begin{cases} \text{sgn}(e[k]) \cdot (i_{ss} + i_{sr}[k]) & (|e[k]| > 0) \\ 0 & (\text{otherwise}) \end{cases} \quad (2)$$

[Formula 3]
$$i_{sr}[k] = i_{sr0}[k] + d_{sr} \cdot (k - l) \quad (3)$$

[Formula 4]
$$i_s[k] = \begin{cases} \text{sgn}(e[k]) \cdot (i_{ss} + i_{sr}[k]) & (|e[k]| > 0) \\ 0 & (\text{otherwise}) \end{cases} \quad (4)$$

(where $d_{sr}$ is the amount of increase in the ramp, and l is a time at which friction compensation action commences).

Figure 7:
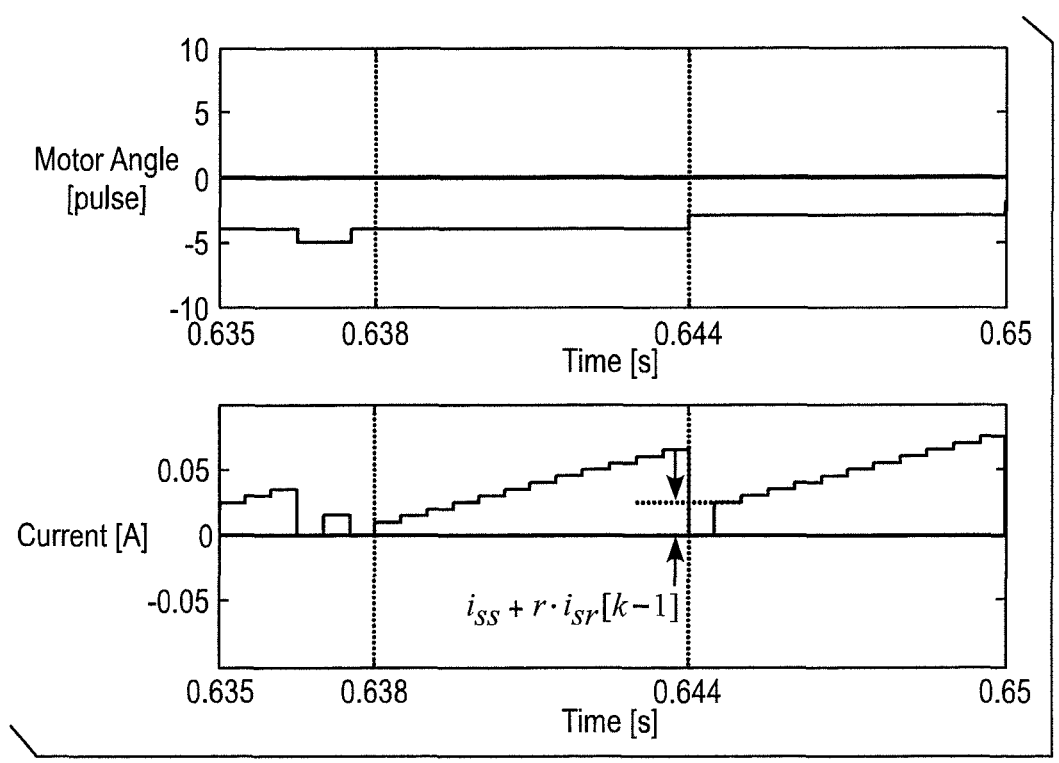
FIG. 7 is a graph showing motor shaft response and adaptive friction compensation amount in cases wherein the motor shaft is stopped outside of a stabilization range.

FIG. 7 shows an example of the response of the device when the motor shaft stops with a deviation. The upper graph shows the motor shaft response, and the lower graph shows the static friction compensation amount $i_s$. Between 0.638 seconds and 0.644 seconds, the static friction compensation amount $i_s$ is increased from when the motor shaft stops with a deviation to when it is actuated. When the motor shaft is re-actuated at 0.644 seconds, the value used for the default value $i_{sr0}$ is a value obtained by multiplying the compensation amount $i_{sr}$ of the ramp function immediately before the motor shaft is actuated by the friction update value r, and the speed with which the motor shaft is re-actuated when it stops again is increased. It is thereby possible to reliably actuate the motor shaft when the static frictional force varies with a change in temperature, without entering an excessive static friction compensation amount.

Therefore, if there is a surplus or deficit in the amount of static friction compensation, the motor shaft cannot stop at the target angle. As described above, step-form and ramp-form static friction compensation are jointly used in adaptive friction compensation. However, in cases when there is a large deficit in the compensation amount, waiting for the ramp functions to accumulate adversely affects the response performance. Therefore, the step-function compensation amount $i_{ss}$ is changed when the positioning trial concludes, as shown in Formula (5).

[Formula 5]
$$i_{ss} = \begin{cases} i_{ss} + i_{ss\_i} & (|e[t_{Set}]| > \theta_{stab} \text{ and flag} = 0) \\ i_{ss} + i_{ss\_d} & (|e[t_{Set}]| > \theta_{stab} \text{ and flag} = 1) \\ i_{ss} & (\text{otherwise}) \end{cases} \quad (5)$$

(where "flag" is a flag indicating that the stabilization range has been reached)

Specifically, in cases when the motor shaft does not reach the stabilization range $\theta_{stab}$ in any of the positioning trials; i.e., when there is insufficient compensation, the value of the step-function compensation amount $i_{ss}$ is increased by $i_{ss\_i}$. In cases where vibration exceeding the stabilization range $\theta_{stab}$ persists even after the motor shaft has reached the stabilization range in each of the trials, the value of compensation amount $i_{ss}$ is decreased by $i_{ss\_d}$ in order to prevent against excessive friction compensation. Vibration outside the stabilization range $\theta_{stab}$ is determined to persist in cases where the motor shaft angle is outside the stabilization range $\theta_{stab}$ at a trial-concluding time $t_{Set}$ although [the motor shaft] has entered the stabilization range one or more times during positioning.

Figure 8:
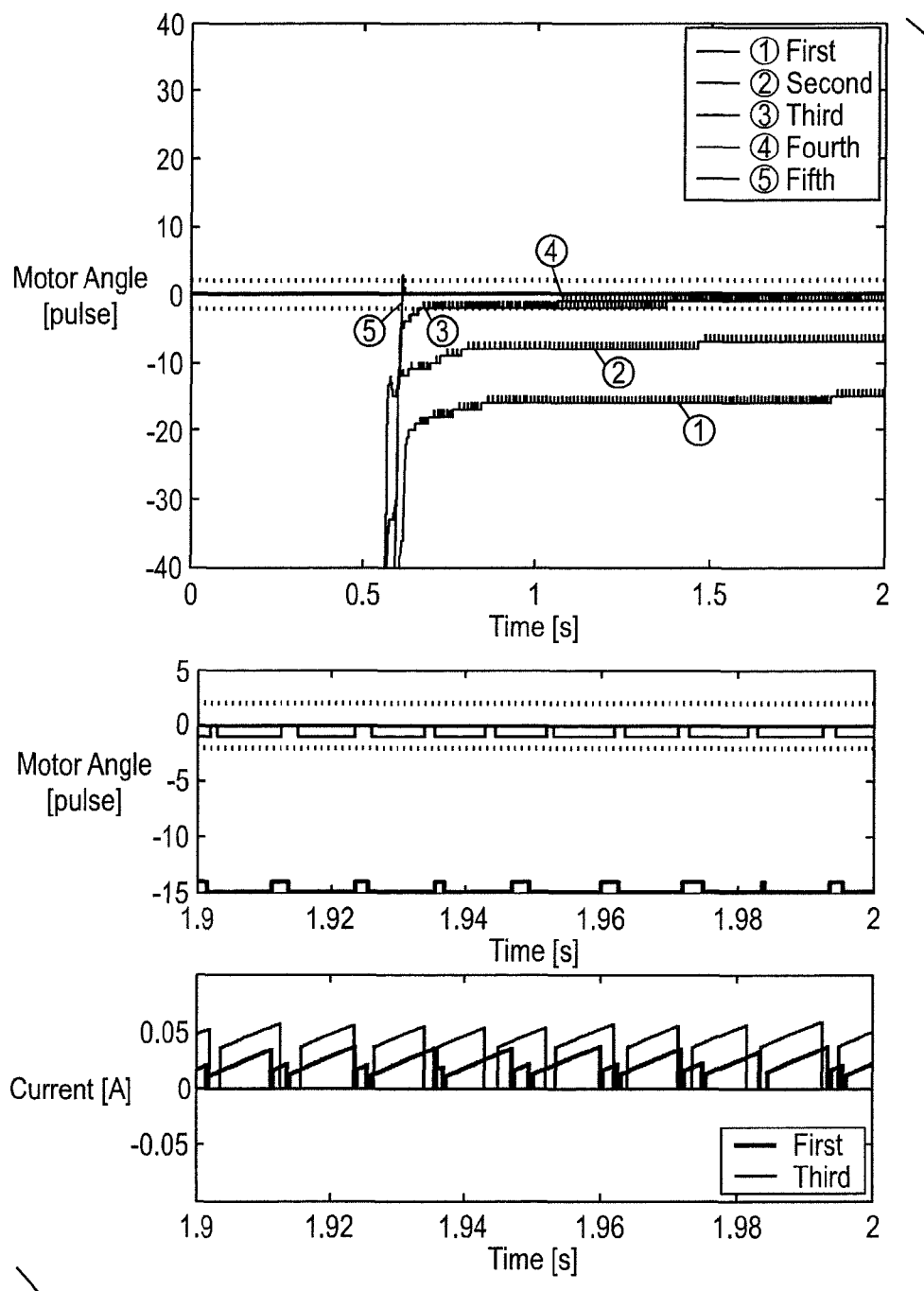
FIG. 8 is a graph showing motor shaft response when friction compensation is insufficient.
Figure 9:
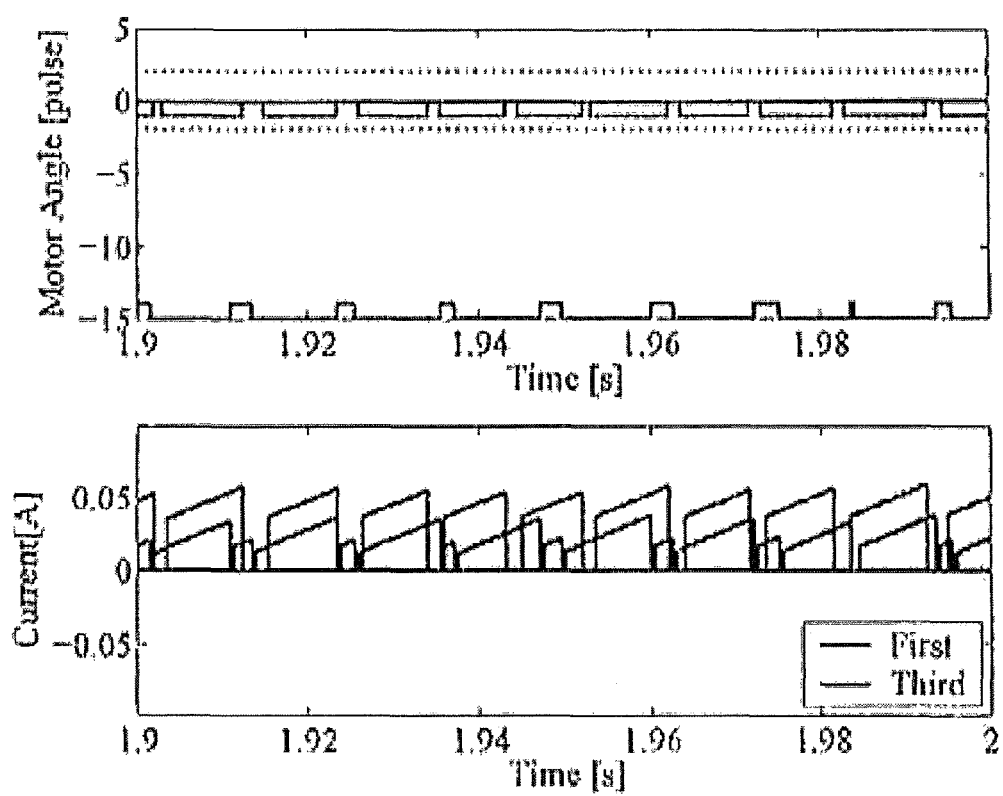
FIG. 9 is a graph showing motor shaft response and static friction compensation amount when friction compensation is insufficient.

FIG. 8 shows the motor shaft response during five cycles of positioning actuation, and FIG. 9 shows an example of the response of the device in a first trial and a third trial. The black horizontal broken lines in FIG. 8 and the top graph of FIG. 9 represent the stabilization range $\theta_{stab}$. Lines a through e in the lower part of in FIG. 8 show, respectively, a first trial, a second trial, a third trial, a fourth trial, and a fifth trial. The upper graph in FIG. 9 shows motor shaft response, and the lower graph shows static friction compensation amount $i_s$.

FIG. 8 shows the compensation was insufficient according to the response from the first trial; therefore, the motor shaft had not been actuated to the target angle. However, according to the static friction compensation amount in the lower graph in FIG. 9, a response in which the target angle was reached in the third and later trials was obtained by increasing the step-function compensation amount $i_{ss}$ with each successive trial.

(2.2 Coulomb Friction Compensation (when the Motor Shaft is Re-Actuated))

Once actuated, the motor shaft is kept from immediately stopping by switching from static friction compensation to the step-function Coulomb friction compensation amount $i_c$ shown in Formula (6).

In the stabilization range $\theta_{stab}$ ($\theta_{stab} < \theta_{effect}$), the motor shaft does not need to be actuated to a particularly large degree, but the compensation amount must be changed to cause it to stop at the target angle. Therefore, the Coulomb friction compensation amount $i_{cs}$ is decreased from $i_{cs\_effect}$ to $i_{cs\_stab}$ within the stabilization range $\theta_{stab}$, as shown in Formula (7).

As regards the ramp compensation amount $i_{cr}$ (discussed later), when the motor shaft stops at the target angle, a compensation amount $i_{cr}$ of the monotonically decreasing ramp function shown in Formula (8) is used to gradually reduce the Coulomb friction compensation amount in order to keep the motor shaft from returning to the immediately preceding angle.

[Formula 6]
$$i_c = \begin{cases} \text{sgn}(\omega_m[k]) \cdot i_{cs} & (e[k] \neq 0) \\ i_{cr}[k] & (e[k] = 0) \end{cases} \quad (6)$$

[Formula 7]
$$i_{cs} = \begin{cases} i_{cs\_stab} & (e|[k]| < \theta_{stab}) \\ i_{cs\_effect} & (\theta_{stab} \leq |e[k]| < \theta_{effect}) \\ 0 & (\theta_{effect} \leq |e[k]| \text{ or } |\omega_m[k]| > 1[\text{pulse}/T_s]) \end{cases} \quad (7)$$

-continued

[Formula 8]

$$i_{cr} = \begin{cases} \text{sgn}(\omega_m[n]) \cdot (i_{cs\_stab} - d_{cr} \cdot (k-n)) & (|i_{cs\_stab}| > |d_{cr} \cdot (k-n)|) \\ 0 & (|i_{cs\_stab}| \leq |d_{cr} \cdot (k-n)|) \end{cases} \quad (8)$$

(where $d_{cr}$ is the amount by which the ramp compensation decreases, and n is the time at which [the shaft] stops at the target angle)

In addressing friction when the motor shaft is stopped, the Coulomb friction compensation is limited to $|\omega_m[k]| \leq 1$ (pulse/$T_s$) in the present compensation method when the motor shaft is moving slowly within the effective friction compensation range $\theta_{effect}$.

Figure 10:
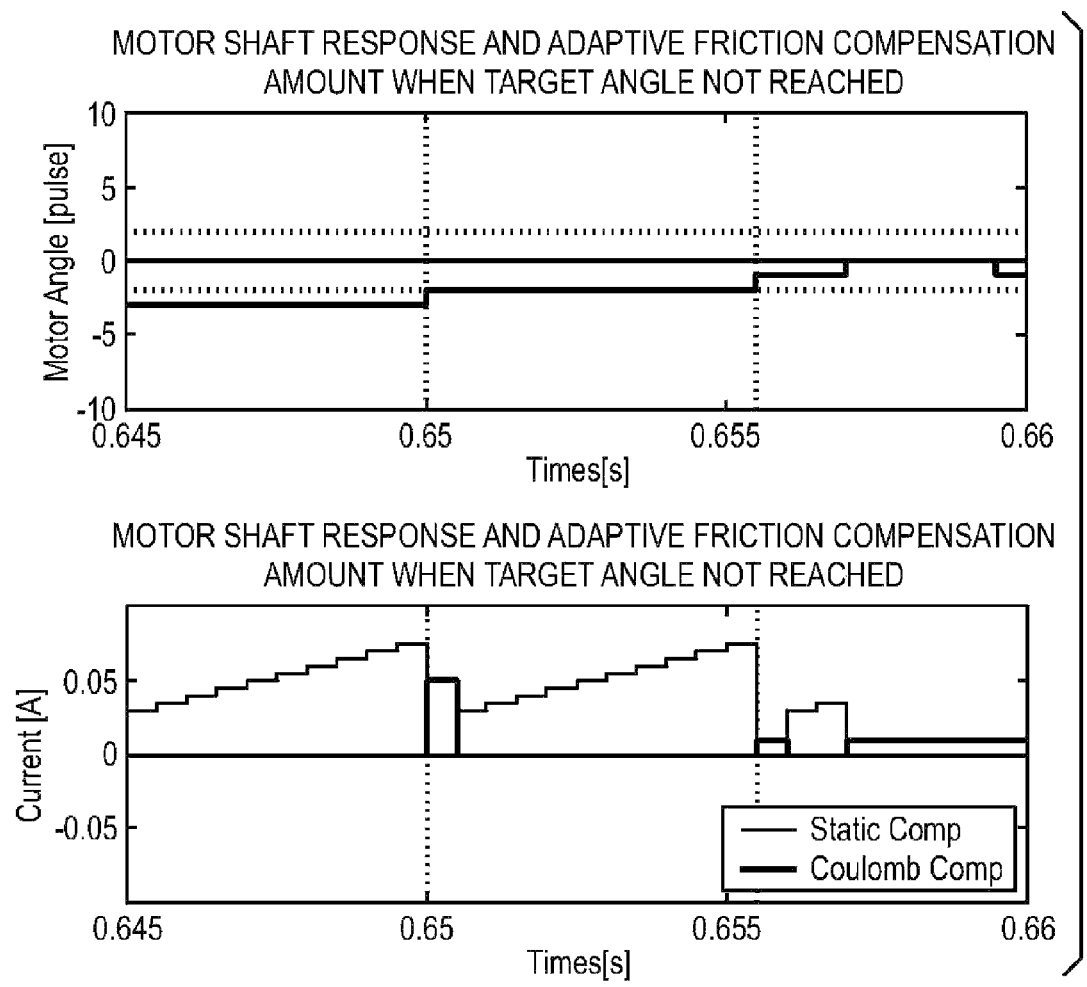
FIG. 10 is a graph showing motor shaft response and adaptive friction compensation amount when a target angle is not reached.
Figure 11:
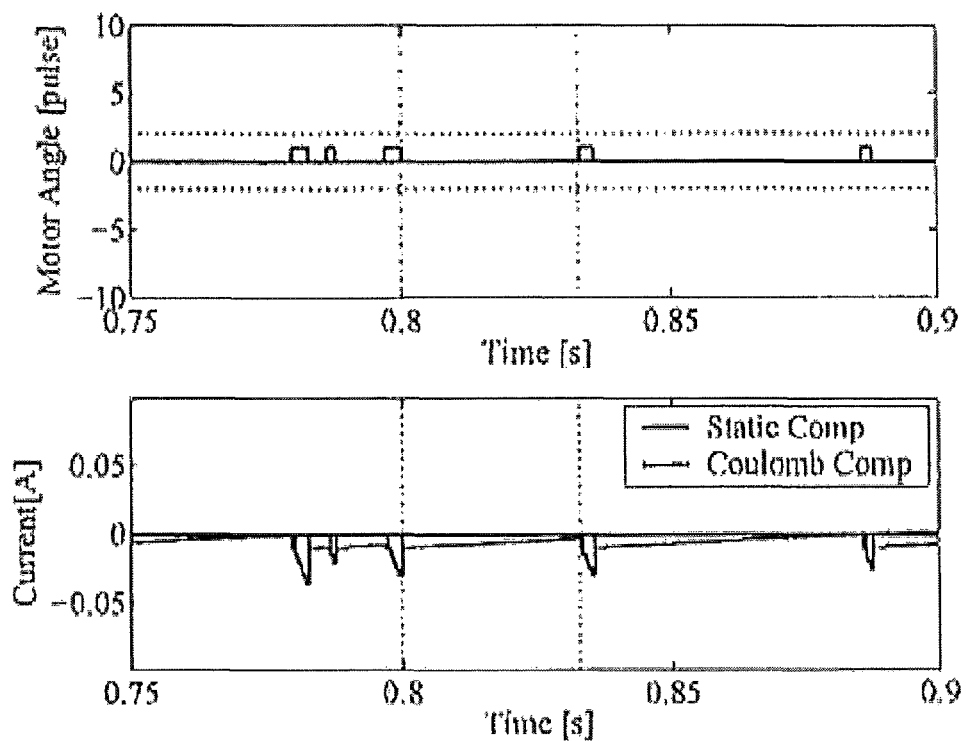
FIG. 11 is a graph showing motor shaft response and adaptive friction compensation amount when a target angle is reached.

Examples of device response both when the target angle has and has not been reached are shown in FIGS. 10 and 11. The motor shaft response is shown in the upper graphs, and the adaptive friction compensation amount $i_{comp}$ is shown in the lower graphs. In the upper graphs, the stabilization range $\theta_{stab}$ is shown by the horizontal dotted lines, whereas in the lower graphs, the static friction compensation amount is shown by line a, and the Coulomb friction compensation amount by line b.

When the motor shaft is re-actuated at 0.65 seconds in FIG. 10, then at low motor shaft speeds; i.e., when $|\omega_m[k]| \leq 1$ (pulse/$T_s$), compensation is performed by switching to the Coulomb friction compensation shown by line b. At 0.655 seconds the motor shaft has reached the stabilization range $\theta_{stab}$, and the subsequent Coulomb friction compensation amount is reduced from $i_{cs\_effect}$ to $i_{cs\_stab}$.

According to the response of the device shown in FIG. 11 for when the stabilization range has been reached, the motor shaft has stopped at the target angle between 0.8 and 0.833 seconds; therefore, gradually reducing the compensation amount keeps the motor shaft from returning to the immediately preceding angle.

(3. Investigations of the Effectiveness of Adaptive Friction Compensation)

(3.1 Setting the Parameters for Adaptive Friction Compensation)

The parameters for adaptive friction compensation shown in Table 3 are set as described below.

Friction Compensation Step Compensation Amount $i_{ss}$

A higher value corresponds to a higher speed at which the motor shaft can be re-actuated; however, if the value is higher than the static frictional force, overcompensation will result, and vibration of several pulses will occur ahead of and behind the target angle. The parameter was set to a value lower than the current command value when the motor shaft was re-actuated at an ambient temperature of 40° C. in order to prevent overcompensation.

Friction Compensation Ramp Compensation Amount $i_{sr0}$

The default value was set to "0," since it would be updated each time the motor shaft is actuated.

Friction Compensation Ramp Compensation Increase Amount $d_{sr}$

A higher value corresponds to a higher speed at which the motor shaft can be re-actuated; however, if the value is too high, vibratory response will readily occur. A value larger than the accumulation amount in an integrator when the motor shaft is stopped (0.0003 [A/Ts]) was set by trial and error.

Friction Compensation Step Compensation Increase Amount $i_{ss\_i}$:

A higher value corresponds to a lower incidence of insufficient friction compensation and a higher speed at which the motor shaft can be re-actuated; however, if the value is too high, vibratory response will readily occur. A value at which the stabilization range could be reached over several trials was set by trial and error.

Friction Compensation Step Compensation Decrease Amount $i_{ss\_d}$

A higher value corresponds to a higher likelihood of avoiding vibratory response; however, if the value is too high, re-actuation of the motor shaft will be delayed, meaning that the motor shaft will be likely to stop before the target angle. A value by which the compensation amount was gradually reduced was set by trial and error.

Friction Update Value r

A higher value corresponds to a higher value of the static friction compensation amount applied when the motor shaft stops again; therefore, the motor shaft can be re-actuated at a higher speed. However, if the value is too high, vibratory response will readily occur. A value at which the compensation would not be excessive at 40° C. was set by trial and error.

Coulomb Friction Compensation Step Compensation Amount $i_{cs\_effect}$

A higher value corresponds to a higher degree of motor shaft actuation without stopping; however, if the value is too high, the motor shaft will more readily overshoot the target angle. In order to prevent the motor shaft from stopping, a Coulomb frictional force identified by a constant speed test at 10° C. was used.

Coulomb Friction Compensation Step Compensation amount $I_{cs\_stab}$

A higher value corresponds to a higher Coulomb friction compensation amount $i_c$ within the stabilization range $\theta_{stab}$; therefore, the motor shaft will tend to have a higher degree of actuation even in the stabilization range. However, if the value is too high, the motor shaft will tend not to stop at the target angle. A value that was the same as the friction compensation step compensation amount $i_{ss}$ was used in order for the inputted compensation amount to be a compensation amount enabling the motor shaft to stop at the target angle without a high degree of actuation.

Coulomb Friction Compensation Ramp Compensation Decrease Amount $d_{cr}$

A higher value corresponds to a greater likelihood of the motor shaft, after having stopped at the target angle, returning to the angle before it reached the target angle; however, if the value is small, the motor shaft will more readily overshoot the target angle. A value was set using several samples so that the amount of compensation would not be zero.

Effective Friction Compensation range $\theta_{effect}$

According to the proposed adaptive friction compensation, static friction compensation in the vicinity of a target angle is addressed, whereas compensation with respect to kinetic friction during response is not taken into consideration. Therefore, in order to set a sufficient value as a value in the vicinity of the target angle, the maximum overshoot value was used during positioning response at an ambient temperature of 10 to 40° C.

Stabilization Range $\theta_{stab}$

A higher value within the stabilization range corresponds to the motor shaft tending to be actuated to a less high degree in the vicinity of the target angle in order to reduce the Coulomb friction compensation amount $i_c$; however, if the value is too high, the motor shaft will tend to stop in advance of the target angle. The stabilization range was set to 2 pulses in order to achieve a compensation effect on a par with that of the conventional static friction compensation method at an ambient temperature of 25° C.

(3.2 Experimentation Using the Device)

Figure 12A:
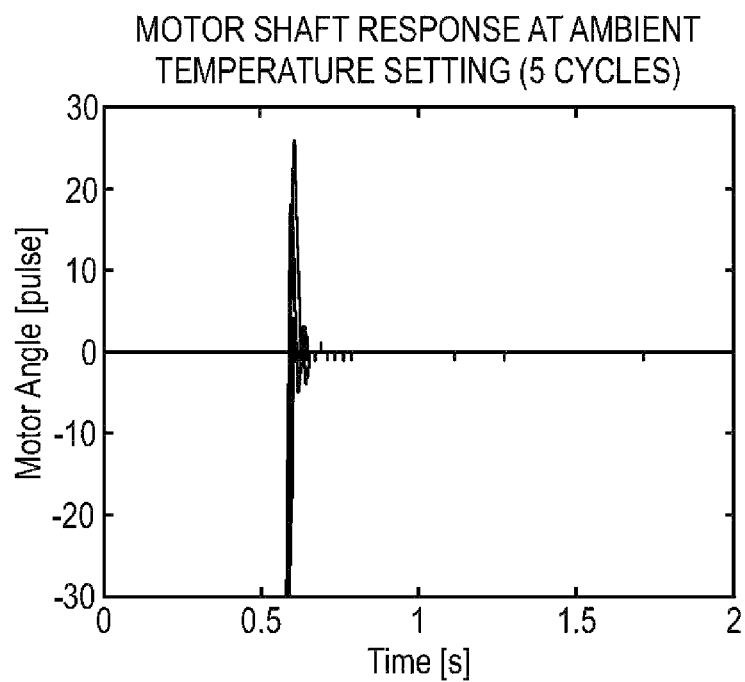
FIG. 12 represents graphs (a) to (c), which show motor shaft response at an ambient-temperature setting.
Figure 12B:
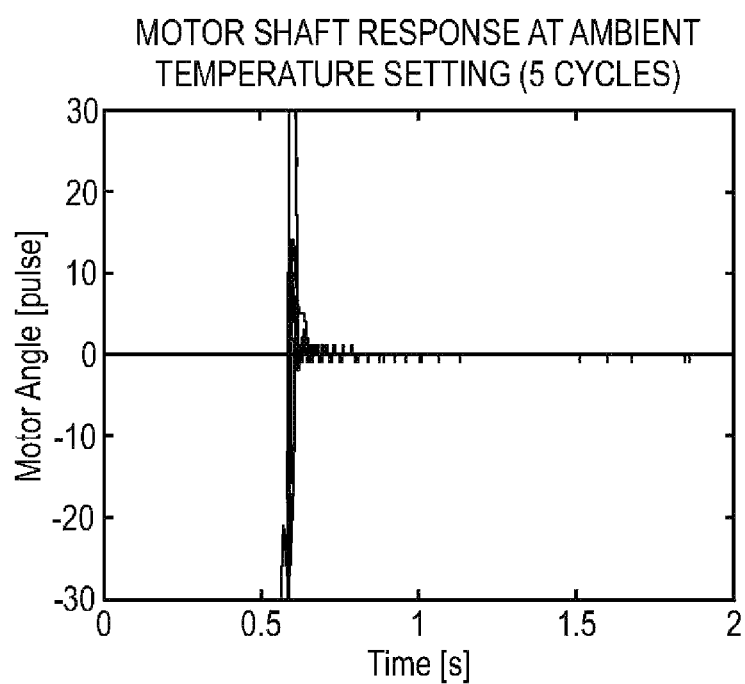
Figure 12C:
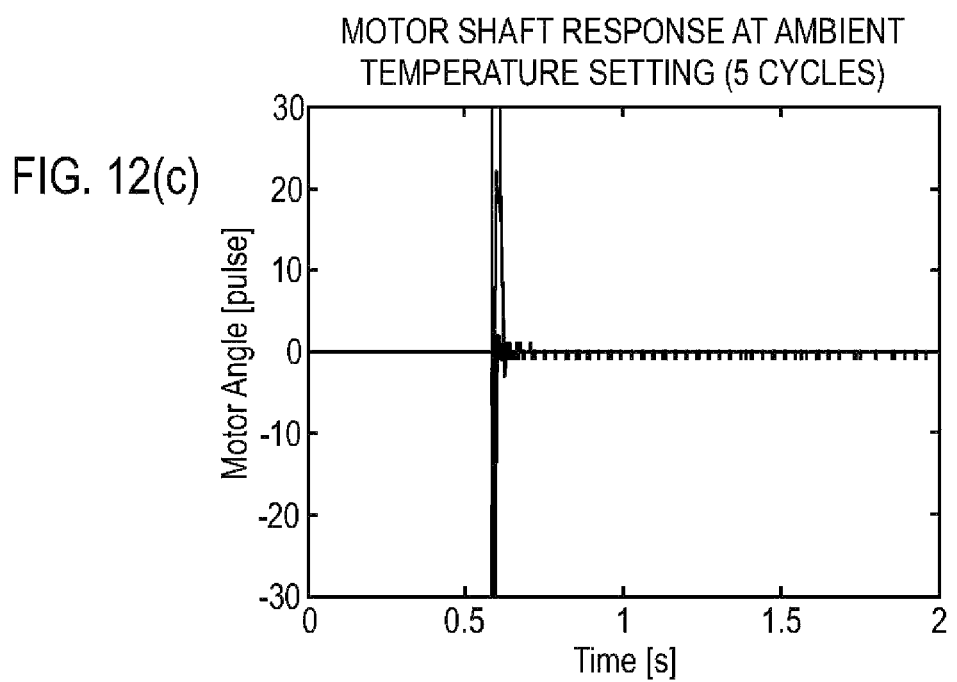

The effectiveness of adaptive friction compensation was investigated using the results of positioning response under pre-set ambient temperature. The conditions employed in the positioning experiment are shown in Table 2, and the response of the motor shaft of the device is shown in FIG. 12. The drawings show that the motor shaft reached the target angle at all temperatures without prominent vibration ahead of or behind the target angle, and confirm that the compensation method according to the present invention offers robust compensation with respect to variations in characteristics accompanying changes in temperature.

TABLE 2

Experimental conditions

| | |
|---|---|
| Action: | Continuous unidirectional positioning |
| Control system: | P-PI control system + adaptive friction compensation |
| Pre-set parameters for adaptive friction compensation: | Shown separately in Table 3 |
| Feed angle: [deg] | 43.56 (Motor shaft: 6.05 rotations) |
| Interval: [s] | 2 |
| Rotation direction: | CW |

TABLE 3

Pre-set parameters for adaptive friction compensation

| | | |
|---|---|---|
| Friction compensation step compensation amount $i_{ss}$ | [A] | 0.01 |
| Friction compensation ramp compensation amount $i_{sr0}$ | [A] | 0 |
| Friction compensation ramp compensation increase amount $d_{sr}$ | [A/$T_s$] | 0.005 |
| Friction compensation step compensation increase amount $i_{ss\_i}$ | [A] | 0.01 |
| Friction compensation step compensation decrease amount $i_{ss\_d}$ | [A] | 0.005 |
| Friction update value r | | 0.3 |
| Coulomb friction compensation step compensation amount $i_{cs\_effect}$ | [A] | 0.04 |
| Coulomb friction compensation step compensation amount $i_{cs\_stab}$ | [A] | 0.01 |
| Coulomb friction compensation ramp compensation decrease amount $d_{cr}$ | [A/$T_s$] | 0.0001 |
| Effective friction compensation range $\theta_{effect}$ | [pulse] | 100 |
| Stabilization range $\theta_{stab}$ | [pulse] | 2 |
| Trial-concluding time $t_{Set}$ | [sample] | 4000 |

What is claimed is:

1. A method for performing adaptive friction compensation in an actuator while accounting for variation in friction characteristics of a wave gear drive accompanying changes in temperature, the method comprising:
   using a semi-closed loop system for controlling a position of a load shaft on the basis of a detected position of a motor shaft of a motor to perform drive control of an actuator in which output rotation of the motor is reduced via a wave gear drive and transmitted from the load shaft toward a load; and
   minimizing a reduction in accuracy with which the load shaft is positioned by the semi-closed loop system, as caused by variation in friction characteristics of the wave gear drive accompanying a change in the ambient temperature; wherein
   as a friction compensation current $i_{comp}$ applied to a motor drive current for driving the motor, a static friction compensation current $i_s$ is used when the motor shaft stops with a deviation, and a Coulomb friction compensation current $i_c$ is used in other circumstances, wherein:

$$i_{comp}[k] = \begin{cases} i_s[k] & (|e[k]| > 0 \text{ and } \omega_m[k] = 0) \\ i_c[k] & (\text{otherwise}) \end{cases} \quad (A)$$

where
   k is the present time,
   e[k] is the motor shaft deviation, and
   $\omega_m[k]$ is the motor shaft speed;
   the static friction compensation current $i_s$ is defined wherein:

$$i_s[k] = \begin{cases} \text{sgn}(e[k]) \cdot (i_{ss} + i_{sr}[k]) & (|e[k]| > 0) \\ 0 & (\text{otherwise}) \end{cases} \quad (B)$$

wherein a compensation amount $i_{sr}$ of a monotonically increasing ramp function defined by $$i_{sr}[k] = i_{sr0}[k] + d_{sr} \cdot (k-l) \quad (C)$$

is added to a compensation amount $i_{ss}$ of a step function, where
   $i_{sr0}$ is a default value of the ramp-function compensation amount $i_{sr}$,
   $d_{sr}$ is the amount of ramp increase, and
   l is a time at which a friction compensation actuation commences; and
   the Coulomb friction compensation current $i_c$ is a step-function compensation amount $i_{cs}$ or a ramp-function compensation amount $i_{cr}$, defined by:

$$i_c = \begin{cases} \text{sgn}(\omega_m[k]) \cdot i_{cs} & (e[k] \neq 0) \\ i_{cr}[k] & (e[k] = 0) \end{cases} \quad (D)$$

2. The method for performing adaptive friction compensation in an actuator while accounting for variation in friction characteristics of a wave gear drive accompanying changes in temperature of claim 1, further comprising:
   updating, when the motor shaft is re-actuated, the default value $i_{sr0}$ of the ramp-function compensation amount $i_{sr}$ used for calculating the static friction compensation current $i_s$, using a value obtained by multiplying the immediately preceding ramp-function compensation amount $i_{sr}$ by a friction update value r, as shown by:

$$i_{sr0}[k] = \begin{cases} i_{sr}[k-1] \cdot r & (\omega_m[k] \neq 0) \\ i_{sr0}[k] & (\omega_m[k] = 0) \end{cases} \quad (E)$$

3. The method for performing adaptive friction compensation in an actuator while accounting for variation in friction characteristics of a wave gear drive accompanying changes in temperature in claim 2, further comprising:
   on conclusion of a positioning trial,
   increasing by a pre-set step compensation increase amount $i_{ss\_i}$, the value of the step-function compensation amount $i_{ss}$ used for calculating the static friction compensation current $i_s$ in a case where the motor shaft does not reach a pre-set stabilization range $\theta_{stab}$ even once in a given positioning trial;
   decreasing by a pre-set step compensation decrease amount $i_{ss\_d}$ the value of the compensation amount $i_{ss}$ in a case where the motor shaft exhibits persistent vibration exceeding the stabilization range $\theta_{stab}$ even after having reached the stabilization range in a given positioning trial; and determining that the vibration exceeding the stabilization range $\theta_{stab}$ persists in a case where the motor shaft has reached the stabilization range one or more times during positioning, but an angle thereof falls outside the stabilization range $\theta_{stab}$ at a trial-concluding time $t_{Set}$, as shown by:

$$i_{ss} = \begin{cases} i_{ss} + i_{ss\_i} & (|e[t_{Set}]| > \theta_{stab} \text{ and flag} = 0) \\ i_{ss} - i_{ss\_d} & (|e[t_{Set}]| > \theta_{stab} \text{ and flag} = 1) \\ i_{ss} & (\text{otherwise}) \end{cases} \quad (F)$$

where
"flag" is a flag indicating that the stabilization range has been reached.

4. The method for performing adaptive friction compensation in an actuator while accounting for variation in friction characteristics of a wave gear drive accompanying changes in temperature in claim 2, further comprising:

decreasing, from a pre-set value $i_{cs\_effect}$ to an even smaller value $i_{cs\_stab}$, the step-function compensation amount $i_{cs}$ used for calculating the Coulomb friction compensation current $i_s$ within a stabilization range $\theta_{stab}$ smaller than a pre-set effective friction compensation range $\theta_{effect}$ ($\theta_{stab} < \theta_{effect}$).

5. The method for performing adaptive friction compensation in an actuator while accounting for variation in friction characteristics of a wave gear drive accompanying changes in temperature in claim 2, further comprising:

using, as the ramp-function compensation amount $i_{cr}$ used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

6. The method for performing adaptive friction compensation in an actuator while accounting for variation in friction characteristics of a wave gear drive accompanying changes in temperature in claim 1, further comprising:

on conclusion of a positioning trial, increasing by a pre-set step compensation increase amount $i_{ss\_i}$, the value of the step-function compensation amount $i_{ss}$ used for calculating the static friction compensation current $i_s$ in a case where the motor shaft does not reach a pre-set stabilization range $\theta_{stab}$ even once in a given positioning trial;

decreasing by a pre-set step compensation decrease amount $i_{ss\_d}$ the value of the compensation amount $i_{ss}$ in a case where the motor shaft exhibits persistent vibration exceeding the stabilization range $\theta_{stab}$ even after having reached the stabilization range in a given positioning trial; and determining that the vibration exceeding the stabilization range $\theta_{stab}$ persists in a case where the motor shaft has reached the stabilization range one or more times during positioning, but an angle thereof falls outside the stabilization range $\theta_{stab}$ at a trial-concluding time $t_{Set}$, as shown by:

$$i_{ss} = \begin{cases} i_{ss} + i_{ss\_i} & (|e[t_{Set}]| > \theta_{stab} \text{ and flag} = 0) \\ i_{ss} + i_{ss\_d} & (|e[t_{Set}]| > \theta_{stab} \text{ and flag} = 1) \\ i_{ss} & (\text{otherwise}) \end{cases} \quad (F)$$

where
"flag" is a flag indicating that the stabilization range has been reached.

7. The method for performing adaptive friction compensation in an actuator while accounting for variation in friction characteristics of a wave gear drive accompanying changes in temperature in claim 6, further comprising:

decreasing, from a pre-set value $i_{cs\_effect}$ to an even smaller value $i_{cs\_stab}$, the step-function compensation amount $i_{cs}$ used for calculating the Coulomb friction compensation current $i_s$ within a stabilization range $\theta_{stab}$ smaller than a pre-set effective friction compensation range $\theta_{effect}$ ($\theta_{stab} < \theta_{effect}$).

8. The method for performing adaptive friction compensation in an actuator while accounting for variation in friction characteristics of a wave gear drive accompanying changes in temperature in claim 6, further comprising:

using, as the ramp-function compensation amount $i_{cr}$ used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

9. The method for performing adaptive friction compensation in an actuator while accounting for variation in friction characteristics of a wave gear drive accompanying changes in temperature in claims 1, further comprising:

decreasing, from a pre-set value $i_{cs\_effect}$ to an even smaller value $i_{cs\_stabl}$ the step-function compensation amount $i_{cs}$ used for calculating the Coulomb friction compensation current $i_c$ within a stabilization range $\theta_{stab}$ smaller than a pre-set effective friction compensation range $\theta_{effect}$ ($\theta_{stab} < \theta_{effect}$).

10. The method for performing adaptive friction compensation in an actuator while accounting for variation in friction characteristics of a wave gear drive accompanying changes in temperature in claim 9, further comprising:

setting to zero the Coulomb friction compensation current $i_c$ ($i_{cs}$) when the motor shaft is stopped, except when the motor shaft speed is lower than a pre-set value in the effective friction compensation range $\theta_{effect}$.

11. The method for performing adaptive friction compensation in an actuator while accounting for variation in friction characteristics of a wave gear drive accompanying changes in temperature in claim 10, further comprising:

using, as the ramp-function compensation amount $i_{cr}$ used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

12. The method for performing adaptive friction compensation in an actuator while accounting for variation in friction characteristics of a wave gear drive accompanying changes in temperature in claim 9, further comprising:

using, as the ramp-function compensation amount $i_{cr}$ used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

13. The method for performing adaptive friction compensation in an actuator while accounting for variation in friction characteristics of a wave gear drive accompanying changes in temperature in claim 1, further comprising:

using, as the ramp-function compensation amount $i_{cr}$, used for calculating the Coulomb friction compensation current $i_c$, a compensation amount of a monotonically decreasing ramp function so as to gradually decrease the Coulomb friction compensation current $i_c$ in order to keep the motor shaft, on having stopped at a target angle, from returning to the immediately preceding angle.

* * * * *